(12) United States Patent
Andersson et al.

(10) Patent No.: US 9,261,210 B2
(45) Date of Patent: Feb. 16, 2016

(54) PIPE CONNECTOR

(75) Inventors: Thomas Andersson, Kungsör (SE); Lars Selling, Köping (SE)

(73) Assignee: OPW Sweden AB, Kungsor (SE)

( * ) Notice: Subject to any disclaimer, the term of this patent is extended or adjusted under 35 U.S.C. 154(b) by 74 days.

(21) Appl. No.: 13/808,916

(22) PCT Filed: Jul. 7, 2011

(86) PCT No.: PCT/SE2011/050924
§ 371 (c)(1),
(2), (4) Date: Feb. 15, 2013

(87) PCT Pub. No.: WO2012/005679
PCT Pub. Date: Jan. 12, 2012

(65) Prior Publication Data
US 2013/0207387 A1    Aug. 15, 2013

(30) Foreign Application Priority Data
Jul. 9, 2010   (SE) ...................................... 1050769

(51) Int. Cl.
| F16L 23/00 | (2006.01) |
| F16L 23/028 | (2006.01) |
| F16L 25/00 | (2006.01) |
| F16L 47/03 | (2006.01) |
| F16L 47/14 | (2006.01) |

(52) U.S. Cl.
CPC ........... *F16L 23/028* (2013.01); *F16L 23/0286* (2013.01); *F16L 25/0072* (2013.01); *F16L 47/03* (2013.01); *F16L 47/14* (2013.01)

(58) Field of Classification Search
CPC ...... F16L 23/028; F16L 33/2071; F16L 33/28
USPC ......... 285/242, 252, 414, 415, 21.1–21.3, 45, 285/55, 423, 412
See application file for complete search history.

(56) References Cited

U.S. PATENT DOCUMENTS 174,475 A * 3/1876 Carleton ........................ 285/412
1,556,745 A   10/1925 Banta
(Continued)

FOREIGN PATENT DOCUMENTS

WO    WO 98/48207 A1   10/1998

OTHER PUBLICATIONS

International Search Report Corresponding to International Application No. PCT/SE2011/050924; Mailing Date: Sep. 8, 2011; 4 Pages.

*Primary Examiner* — Aaron Dunwoody
(74) *Attorney, Agent, or Firm* — Myers Bigel Sibley & Sajovec, PA

(57) ABSTRACT

It is presented a pipe connector (1) comprising a tubular part (2) having a first portion (2-1) with a first outer diameter and second portion (2-2) with a second outer diameter which is larger than the first outer diameter, which second portion has a circumferential groove (11), a removable stop ring (5), which, when arranged in the groove (11), protrudes radially from the tubular part (2), and a flange part (7) having a central through opening for receiving the tubular part (2), wherein the flange part (7) has a shoulder (13) for abutting against the stop ring (5) when the flange part (7) is arranged around the stop ring (5), wherein the first portion (2-1) has a plastic external peripheral surface, and the second portion (2-2) of the tubular part (2) has a metal external peripheral surface.

14 Claims, 4 Drawing Sheets

(56) References Cited

U.S. PATENT DOCUMENTS

| | | | |
|---|---|---|---|
| 2,907,590 A * | 10/1959 | Oswald | 285/98 |
| 3,968,551 A * | 7/1976 | Miyashita | 492/3 |
| 3,968,552 A | 7/1976 | Hunter | |
| 4,007,953 A * | 2/1977 | Powell | 285/321 |
| 4,767,138 A * | 8/1988 | Schafbuch | 285/368 |
| 2006/0232063 A1* | 10/2006 | Steingass et al. | 285/242 |
| 2007/0152446 A1* | 7/2007 | Eriksson | 285/412 |
| 2009/0295154 A1 | 12/2009 | Weil et al. | |

* cited by examiner

PIPE CONNECTOR

RELATED APPLICATIONS

This application is a 35 U.S.C. §371 national phase application of PCT Application PCT/SE2011/050924 filed Jul. 7, 2011 which claims priority to SE 1050769-7 filed Jul. 9, 2010. The entire content of each of these applications is incorporated herein by reference.

FIELD OF THE INVENTION

The invention generally relates to pipes and in particular to a device for the connection of pipes and other parts in a piping system.

BACKGROUND

Pipes may be used for transporting fluids, gasses or other medium from one location to another location. An end face of a pipe may be coupled to an end face of another pipe so as to extend the pipe length, for instance when a fluid or gas needs to be transported over a distance longer than the length of one pipe. Further, an end face of a pipe may also be connected to e.g. a container such as for instance a fuel tank, or any other device, such as a pump, which may provide the medium to the pipe, or to a T-connection. A system comprising at least one pipe connected to e.g. another pipe, a container, or any other suitable device, will in the following be referred to as a piping system.

A pipe coupling in a piping system should provide a robust, non-leaking connection in so that the medium stays within the piping system without leakage, even if the pipe coupling is subject to constant external forces. To this end, an arrangement of two flanges facing and fastened to each other may be utilised at a coupling interface between e.g. two pipes. Each flange typically has a plurality of axial through holes so that bolts may be fasted between the flanges when the end faces have been aligned.

One example of such a device is shown in U.S. Pat. No. 3,968,552, which discloses a method and apparatus for forming a plastic lined junction in a lined pipe. The apparatus comprises a ring fitted within a groove provided in the pipe, and a flange having a shoulder for mating with the ring when the flange is fitted around the ring.

Drawbacks with the above described apparatus are that the junction may become the weakest link in a piping system, both capacity-wise e.g. the apparatus may become a bottleneck, and with regards to robustness. Hence, improvements are needed to overcome the above drawbacks.

SUMMARY

A first object of the present invention is to provide a pipe connector which does not act as a bottleneck in a piping system.

A second object is to provide a more robust pipe connector, in particular in a piping system comprising plastic pipes.

A third object is to provide a pipe connector which is easy to assemble in a piping system on-site.

Accordingly, there is provided a pipe connector comprising a tubular part having a first portion with a first outer diameter and second portion with a second outer diameter which is larger than the first outer diameter, which second portion has a circumferential groove, a removable stop ring, which, when arranged in the groove, protrudes radially from the tubular part, and a flange part having a central through opening for receiving the tubular part, wherein the flange part has a shoulder for abutting against the stop ring when the flange part is arranged around the stop ring, wherein the first portion has a plastic external peripheral surface, and the second portion of the tubular part has a metal external peripheral surface.

By providing a pipe connector that has a second outer diameter that is larger than a first outer diameter of the tubular part, the groove in the pipe connector will not weaken the pipe connector at the groove. Furthermore, the metal portion, i.e. the external metal surface of the second portion ensures high robustness when the pipe connector is arranged to interface two pipe connections. Moreover, the external plastic surface of the first portion allows for the pipe connector to be welded to a pipe via a welding socket thereby further increasing the robustness of a piping system.

One embodiment comprises a tubular plastic part presenting the plastic external peripheral surface, wherein the tubular plastic part is arranged around a tubular metal surface of the first portion.

Beneficially, the tubular plastic part may be welded together with a plastic pipe by means of e.g. a welding socket. Thereby, the pipe connector may act as an interface which connects e.g. two plastic pipes. The second portion may have an outer diameter which is larger than an outer diameter of the tubular plastic part. Thereby, the groove in the metal external peripheral surface will not affect the overall robustness of the pipe connector or the piping system to which it is connected. Especially, the second portion has a thickness which is not affected negatively by the groove.

In one embodiment the second portion and the tubular metal surface of the first portion forms a one-piece metal unit. The pipe connector may hence be produced in one piece, thereby simplifying the production of the pipe connector. Further, a robust metal interface for a piping system is provided, ensuring that the plastic piping system to which the pipe connector is coupled will not have its weakest part at the pipe connector.

Each of the outer diameters and of the first portion and the second portion of the tubular part may be smaller than the diameter of the through opening of the flange part. Thereby, the flange part, and the stop ring, may be brought around the tubular part from either side of the tubular part. This may be beneficial when mounting or de-mounting the pipe connector in a piping system.

The outer diameter of the tubular part at the groove may be at least as large as the outer diameter of the tubular plastic part. Hence, the groove will not diminish the thickness of the tubular part. Thereby a robust pipe connector may be provided which will not weaken the piping system to which it is connected.

The inner diameter of the tubular part may be constant. Thereby, the capacity of the piping system to which the pipe connector is connected will not be reduced at the pipe connector. In contrast, the apparatus presented in the background section has a non-constant inner diameter, as the there is a bulge protruding radially inwards at the groove to compensate for the thinning of the pipe provided by the groove. This protrusion reduces the capacity of a piping system.

The stop ring may have a slit. Thereby the stop ring may be bent open and so as to allow mounting and de-mounting of the stop ring into and from the groove, respectively, by axially sliding the stop ring along the outer surface of the tubular part. By removing the stop ring, the flange part may be brought around the tubular part from either end thereof. This design may simplify mounting and de-mounting of the pipe connector when arranged in a piping system. For instance, if the pipe connector has been welded to a plastic pipe via the tubular plastic part, and repair work requires the disconnection of the pipe connector at an end face of its second portion, and removal of the flange part, the stop ring may be slideably removed from the pipe connector, wherein the flange part may be removed at the end face of the second portion, instead of the first portion.

The flange part may have a radially extending first flange surface extending between the through opening and the outer periphery of the flange part, wherein the first flange surface aligns with an end face of the second part when the shoulder mates with the stop ring. Thereby maximal fastening pressure may be applied to facing flanges when the pipe connector is used in a piping system. Consequently, the pipe connector will provide a more robust and leakage-safe connection.

One embodiment may further comprise a removable inner pipe coupling part having an outer diameter smaller than the inner diameter of the tubular part, wherein the inner pipe coupling part protrudes from the first portion when arranged in the tubular part. The inner pipe coupling part may provide a smooth transition between the pipe connector and the part of the piping system to which it is connected.

The inner pipe coupling part may comprise a conductive material. Thereby, a smooth transition between electric gradients of a plastic pipe to which the pipe connector may be connected to and the internal metal surface of the pipe connector may be provided.

One embodiment may further comprise a fixing device for fixing a portion of the tubular plastic part around the first portion of the tubular part. Thereby, the tubular plastic part may be additionally fastened to the first portion, enhancing the durability of their coupling.

The fixing device may be cylindrical and may be arranged to receive the tubular plastic part.

The first portion may comprise a plurality of peripheral protrusions. Thereby, the tubular plastic part may be more efficiently fixed to the tubular part.

Further features and advantages of the present invention will be evident from the following description.

BRIEF DESCRIPTION OF THE DRAWINGS

The invention and further advantages thereof will now be described by non-limiting examples with reference to the accompanying drawings, of which.

DETAILED DESCRIPTION

In the following description, for purpose of explanation and not limitation, specific details are set forth, such as particular techniques and applications in order to provide a thorough understanding of the present invention. However, it will be apparent for a person skilled in the art that the present invention may be practiced in other embodiments that depart from these specific details. In other instances, detailed description of well-known methods and apparatuses are omitted so as not to obscure the description of the present invention with unnecessary details.

Figure 1:
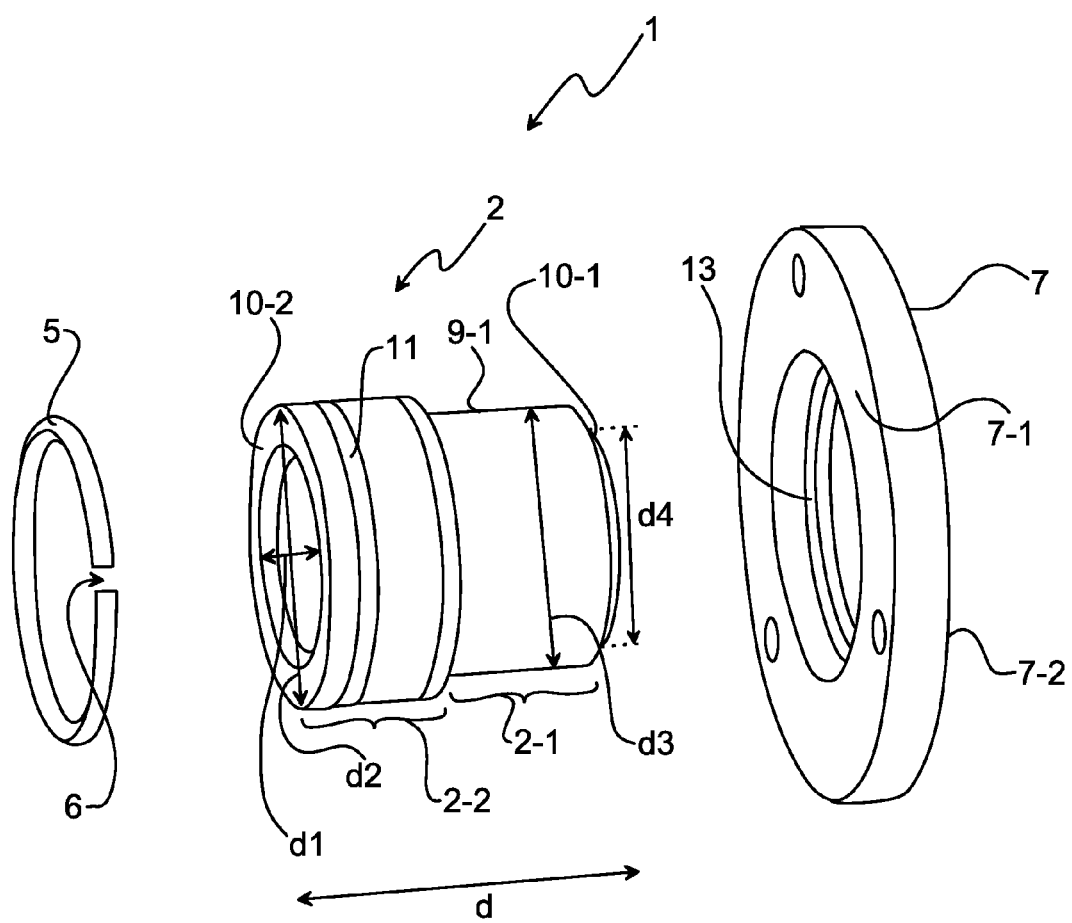
FIG. 1 shows an exploded view of a first example of a pipe connector according to the present invention.

With reference to FIG. 1, a first example of a pipe connector 1 according to the present invention is shown. The pipe connector 1 comprises a tubular part 2, a tubular plastic part 9-1, a stop ring 5, and a flange part 7 which hereinafter will be referred to as an annular flange part.

The tubular part 2 has a first portion 2-1 having a first outer diameter $d4$, and a second portion 2-2 having a diameter $d2$ which is larger than the first outer diameter $d4$.

A plastic has been applied to the first portion 2-1, which plastic defines the tubular plastic part 9-1 of the pipe connector 1.

The second portion 2-2 of the tubular part 2 presents an end opposite the tubular plastic part 9-1 of the pipe connector 1.

The tubular plastic part 9-1 presents a plastic external peripheral surface of the pipe connector 1. The second portion 2-2 of the tubular part 2 presents a metal external peripheral surface of the pipe connector 2. The pipe connector 1 has a first end face 10-1 at its tubular plastic part 9-1. The pipe connector 1 has a second end face 10-2 at the second portion 2-2. The length of the pipe connector 1 is defined by a distance d between the first end face 10-1 and the second end face 10-2.

The second portion 2-2 is provided with a circumferential groove 11. The circumferential groove 11 extends around the metal external peripheral surface.

The pipe connector 1 has an inner diameter $d1$ which is constant. The second portion 2-2 has an outer diameter $d2$ which is larger than the outer diameter $d3$ of the tubular plastic part 9-1. At the groove 11, the tubular part 2 has a diameter which is at least as large as diameter $d2$ of the tubular plastic part 9-1. Thereby, a pipe thickness of the pipe connector 1 may be at least as thick as the total thickness of the tubular plastic part 9-1 together with the thickness of the first portion 2-1 of the tubular part 2 along the length of the pipe connector 2.

Beneficially, by providing non-reduced thickness in the pipe connector 1 also at the groove 11, the robustness of the pipe connector 1 is not reduced. Consequently, the pipe connector 1, i.e. the joint which may connect e.g. a pipe with another pipe, will not be the weakest link in a piping system.

The stop ring 5 has a slit 6. The slit 6 allows the stop ring 5 to be bent open so as to expand. The stop ring 5 may also be reshaped into its annular shape after having been bent open. Thereby, the stop ring 5 may be removeably arranged in the groove 11 by sliding it axially along the tubular arrangement 3. When the stop ring 5 is arranged in the groove 11, the stop ring 5 protrudes radially with respect to the metal external peripheral surface of the second portion 2-2.

The annular flange part 7 can be fitted around the tubular part 2. The central through opening of the annular flange part 7 has a first and a second diameter, both being larger than the outer diameter $d2$ of the tubular part 2. A radially extending surface at the interface of the first and the second diameters defines a surface of a shoulder 13 which abuts the stop ring 5 when the stop ring 5 is concentrically arranged with the flange part 7. In the present example, the shoulder 13 extends circumferentially along the periphery of the central through opening.

When the stop ring 5 is arranged in the groove 11 and the annular flange part 7 is brought, from the right in FIG. 1, around the tubular part 2 and the stop ring 5, the shoulder 13 abuts against the stop ring 5.

The annular flange part 7 has a first and a second flange surface 7-1 and 7-2 respectively. The first and the second flange surface 7-1 and 7-2 each extend radially from a through opening of the annular flange part 7 to the outer periphery of the annular flange part 7. The first and the second flange surfaces 7-1 and 7-2 are on opposite sides of the annular flange part 7.

When the stop ring 5 is arranged in the groove 11 and mates with the shoulder 13, the first surface 7-1 of the flange part 7 is substantially aligned with the second end face 10-2 of the pipe connector 1.

Figure 2:
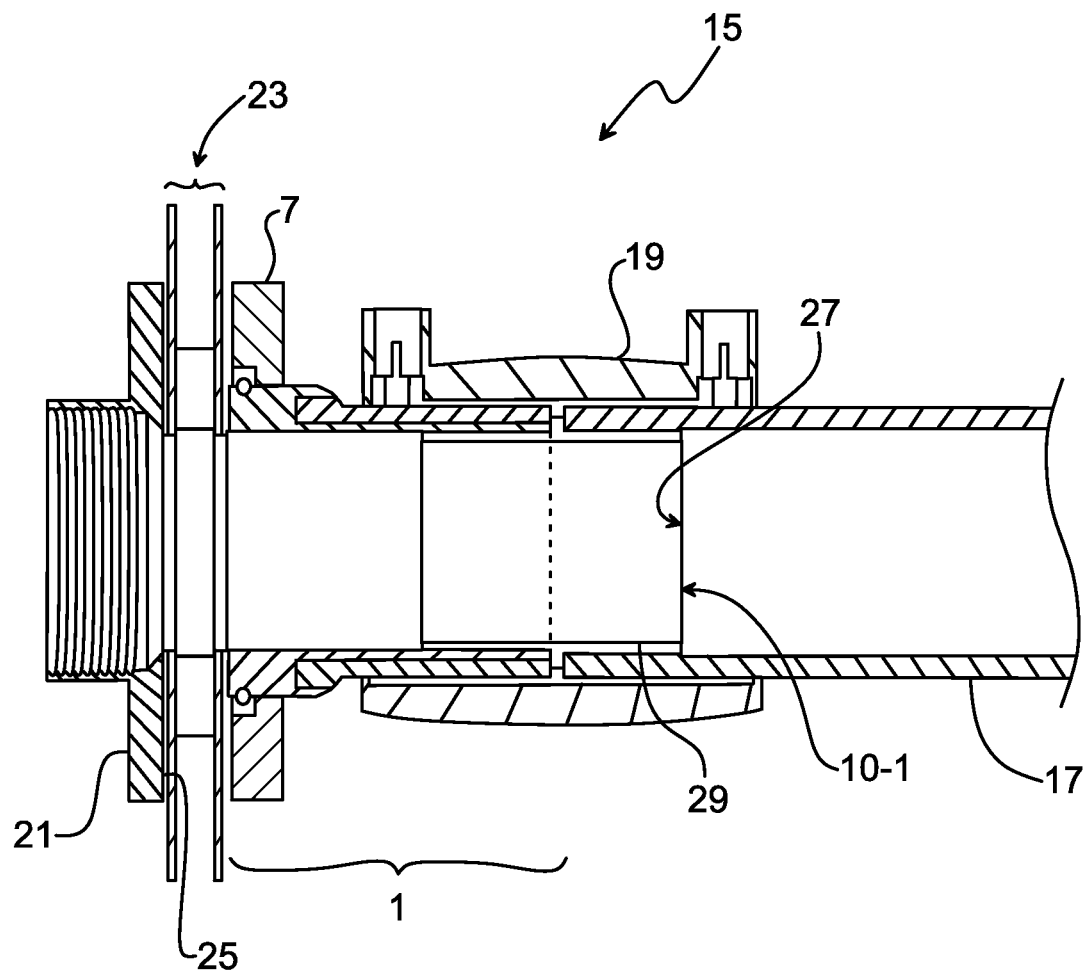
FIG. 2 shows a cross-sectional view of an arrangement in which the pipe connector in FIG. 1 is fitted with a piping system.

FIG. 2 shows the pipe connector of FIG. 1 in a piping system 15. The piping system 15 comprises the pipe connector 1, a plastic pipe 17, a welding socket 19, a flange coupling 21, and a gasket arrangement 23. The gasket arrangement 23 is provided between the second end face 10-2 of the pipe connector 2 and a face 25 of the flange coupling 21, which is opposite the second end face 10-2.

Typically, the flange part 7 and the flange coupling 21 each has a plurality of corresponding axial through holes through which bolts or similar fastening means may be arranged. By means of the bolts, the flange part 7 and the flange coupling 21 may be fastened to each other.

By providing the gasket arrangement 23 between the pipe connector and the flange coupling 23, the connection between the pipe connector 1 and the flange coupling 21 may be properly sealed.

The flange coupling 21 of the illustrated example has threads and may be fastened to e.g. a container such as a petrol container, not shown here for reasons of clarity.

The first end face 10-1 of the pipe connector 1 is aligned with an end face 25 of the plastic pipe 17. The plastic pipe 17 and the tubular plastic part 9-1 of the pipe connector 1 are welded together via the welding socket 19.

In order to provide a smooth conductive transition between an inner conductive surface of the plastic pipe 17 and the inner metal surface of the pipe connector 1, a tubular inner pipe coupling part 29 may be arranged in the through opening of the pipe connector 1 in the first portion 2-1 thereof. The inner pipe coupling part 29 protrudes from the first end face 10-1 when arranged in the tubular part 2. Hence, the inner pipe coupling part 29 mates with the tubular part 2. The protruding part may be mated with the plastic pipe 17, thereby presenting an interface between the pipe connector 1 and the plastic pipe 17.

The inner pipe connector 29 may comprise a conductive or semi-conductive plastic material. Such a plastic material may for instance be Polyoxymethylene (POM) or polyamide. The inner pipe coupling part 29 acts as an interface at the junction between the plastic pipe 17 and the pipe connector 1.

A conductive internal surface in pipes of a piping system allows for the dissipation of electric charge on the internal surface, obtained by friction which arises due to the flow of e.g. a fluid through the piping system 15. Thereby, sparking in the piping system 15 may be prevented. This may be particularly advantageous for instance if the fluid transported in the piping system 15 is a low conductivity liquid such as petrol.

An example of another application of the pipe connector is to act as a connector for connecting one pipe with another pipe. In particular, the pipe connector may connect one plastic pipe with another plastic pipe. In such an arrangement, the coupling typically comprises two pipe connectors facing each other. The corresponding flange parts are then fastened by means of e.g. bolts or similar fastening means. Normally, a gasket arrangement is provided between the flange parts for sealing of the piping system.

The tubular part 2 is typically manufactured as a one piece metal component. The plastic end part 9-1 is provided onto the first portion 2-1 of the tubular part 2 by applying a plastic material on the outer peripheral surface of said first portion 2-1.

Because the groove is provided in the second end portion which is of metal, creeping of the stop ring in the groove, when the flange part is arranged around the tubular part and fastened to an opposite flange in a piping system, is prevented.

Figure 3:
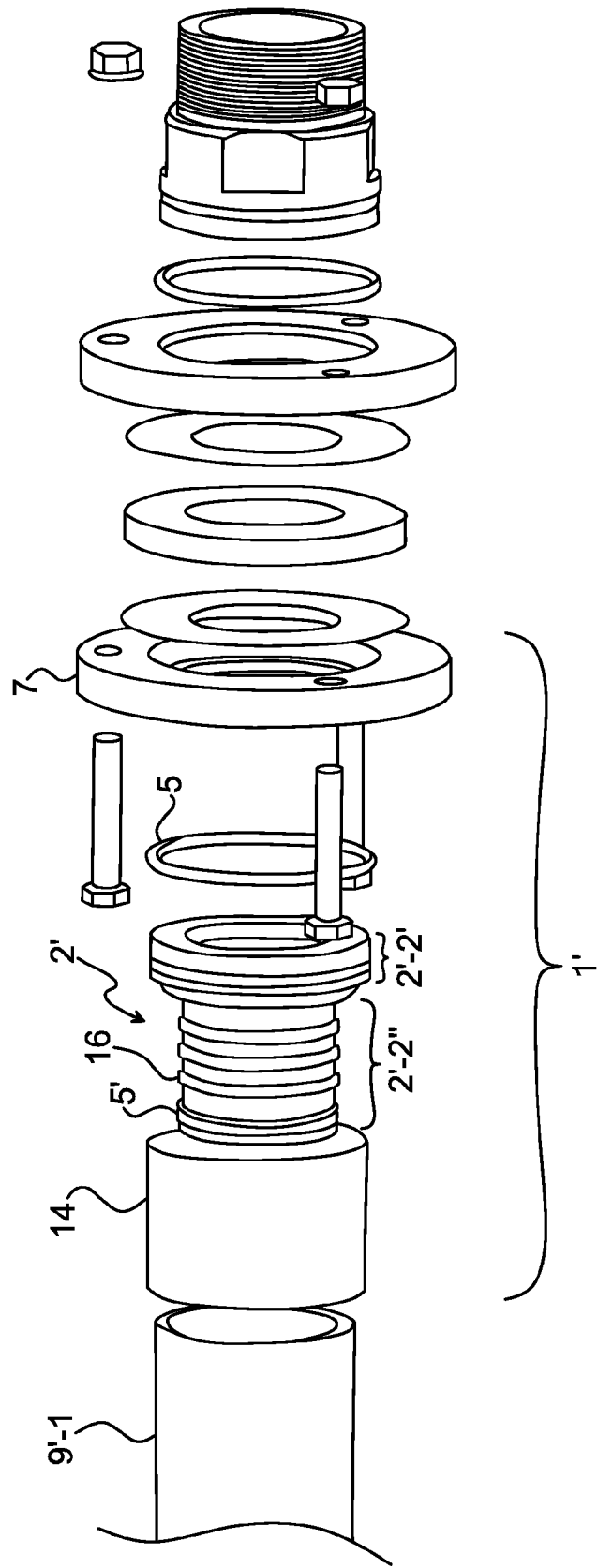
FIG. 3 shows an exploded view of a second example of a pipe connector according to the invention.

Now referring to FIG. 3, a second example of a pipe connector 1' according to the present invention is shown. The pipe connector 1' comprises a tubular part 2", the stop ring 5, a fixing device 14, and the annular flange part 7. The stop ring 5 and the annular flange part 7 will not be described further, as they are similar to those described in the first example.

The tubular metal part 2' has a first portion 2-2 with a first outer diameter and a second portion 2'-2' with a second outer diameter which is larger than the first outer diameter. The second outer diameter is substantially of the same size as an inner diameter of a tubular plastic part 9'-1, e.g. a pipe to which the pipe connector 1' may be connected.

The first portion 2'-2' has a plurality of circumferentially extending radial protrusions 16 distributed axially, and a stop ring 5' in a groove. The first portion 2'-2' is thereby adapted to receive part of the tubular plastic part 9'-1. To this end, the tubular plastic part 9'-1 may be brought over the first portion 2'-2' whereby the protrusions 16 and the stop ring 5' will affix the plastic end part 9'-1 to the tubular part 2'.

To additionally fasten the tubular plastic part 9'-1 to the tubular I part 2', the fixing device 14 which is cylindrical may be brought around the tubular plastic part 9'-1. The fixing device 14 is pressed around the tubular plastic part 9'-1 when the tubular plastic part 9'-1 is arranged around the first portion 2'-2 of the tubular part 2', thereby deforming the fixing device 14 around the tubular plastic part 9'-1 and fixing the tubular plastic part 9'-1 between the first portion 2'-2'" and the fixing device 14.

Figure 4:
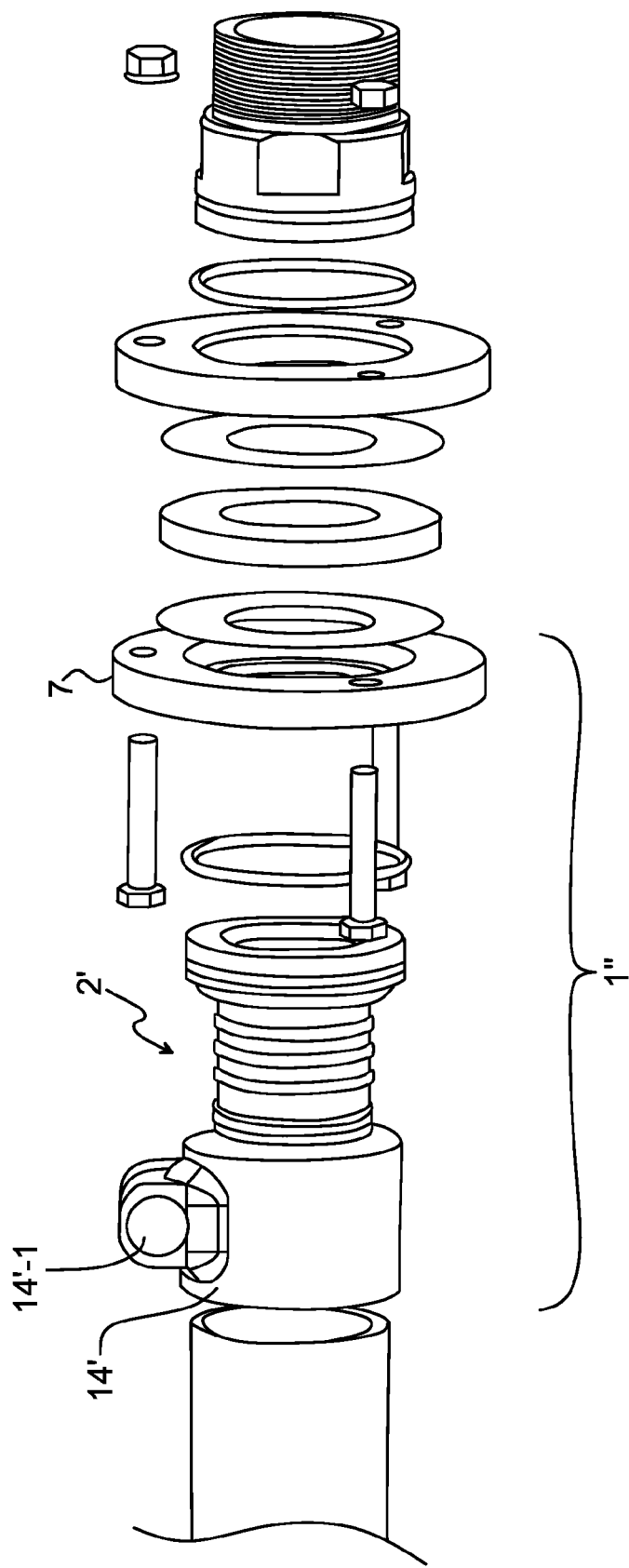
FIG. 4 shows an exploded view of a third example of a pipe connector according to the invention.

FIG. 4 shows a third example of a pipe connector 1" according to the present invention is shown. The pipe connector 1" comprises the tubular part 2', the stop ring 5, the annular flange part 7, and a fixing device 14'.

The third example is in general similar to the second example, except that the third example comprises a different fixing device 14'. The fixing device 14' is cylindrical and may be brought around the tubular plastic part 9'-1. When brought around the tubular plastic part 9'-1, the fixing device 14' may be clamped around the tubular plastic part 9'-1 by means of fastening means 14'-1 herein exemplified by a nut and a bolt. Thereby the tubular plastic part 9'-1 may be fixed between the tubular part 2' and the fixing device 14'.

In the described examples, the tubular part 2, 2' is typically made of a metal, such as steel.

It will be obvious that the present invention may be varied in a plurality of ways. Such variations are not to be regarded as departure from the scope of the present invention as defined by the appended claims. The skilled person in the art would understand in what other type of applications the present method would be useful. For instance, in one variation of the invention, the inner diameter of the tubular part in the second portion may increase proportionally with the outer diameter of the tubular part of the second end portion. Thereby the thickness of the tubular part is maintained also at the groove. Further, the shoulder does not have to extend along the entire inner periphery of the flange part. Instead, a plurality of shoulders portions may be distributed along the inner periphery of the flange part. Moreover, the flange part may have any suitable shape. For instance, the flange part may have an outer periphery presenting a rectangular shaped flange part.

Itemized List Of Embodiments
1. A pipe connector (1; 1'; 1") comprising:
   a tubular part (2; 2') having a first portion (2-1) with a first outer diameter and second portion (2-2) with second outer diameter which is larger than the first outer diameter, which second portion has a circumferential groove (11),
   a removable stop ring (5), which, when arranged in the groove (11), protrudes radially from the tubular part (2; 2'), and
   a flange part (7) having a central through opening for receiving the tubular part (2; 2'), wherein the flange part (7) has a shoulder (13) for abutting against the stop ring (5) when the flange part (7) is arranged around the stop ring (5).
2. The pipe connector (1; 1'; 1") according to item 1, wherein the tubular part is of metal.
3. The pipe connector (1) according to item 1 or 2, comprising a tubular plastic part (9-1), wherein the first portion (2-1) of the tubular part is adapted to receive the tubular plastic part.
4. The pipe connector (1) according to item 2, wherein the tubular plastic part (9-1) has a length that is shorter than the length of the first portion (2-1) of the tubular part (2).
5. The pipe connector (1) as according to item 3 or 4, wherein the second portion (2-2) has an outer diameter d2 which is larger than an outer diameter d3 of the tubular plastic part (9-1).
6. The pipe connector (1) according any of the preceding items, wherein each of the outer diameters d4 and d2 of the first portion (2-1) and the second portion (2-2) of the tubular part (2; 2') are smaller than the diameter of the through opening of the flange part (7).
7. The pipe connector (1) according to any of the items 3-6, wherein the outer diameter d2 of the tubular part (2) at the groove (11) is at least as large as the outer diameter d3 of the tubular plastic part (9-1).
8. The pipe connector (1; 1'; 1") according to any of the preceding items, wherein the tubular part (2; 2') has a greater axial extension than the flange part (7).
9. The pipe connector (1; 1'; 1") according to any of the preceding items, wherein the inner diameter d1 of the tubular part (2) is constant.
10. The pipe connector (1; 1'; 1") according to any of the preceding items, wherein the stop ring (5) has a slit (6).
11. The pipe connector (1; 1'; 1") according to any of the preceding items, wherein the flange part (7) has a radially extending first flange surface (7-1) extending between the through opening and the outer periphery of the flange part (7), wherein the first flange surface (7-1) aligns with an end face (10-2) of the tubular part (2; 2') when the shoulder (13) mates with the stop ring (5).
12. The pipe connector (1) according to any of the items 3-10, further comprising a removable inner pipe coupling part (29) having an outer diameter smaller than the inner diameter of the tubular part (2), wherein the inner pipe coupling part (29) protrudes from the tubular plastic part (9-1; 9'-1) when arranged in the tubular part (2).
13. The pipe connector (1) according to item 12, wherein the inner pipe coupling part (29) comprises a conductive material.
14. The pipe connector (1'; 1") according to item 1, further comprising a fixing device (14; 14') for fixing a portion of the tubular plastic part (9'-1) around the first portion (2-1) of the tubular part (2').
15. The pipe connector (1'; 1") according to item 14, wherein the fixing device (14; 14') is cylindrical and is arranged to receive the tubular plastic part (9'-1).
16. The pipe connector (1'; 1") according to any of the preceding claims, wherein the first portion (2-1) comprises a plurality of peripheral protrusions.

The invention claimed is:
1. A pipe connector comprising:
   a tubular metal part having a first portion with a first outer diameter and a second portion with second outer diameter which is larger than the first outer diameter, which second portion has a circumferential groove,
   a removable stop ring, which, when arranged in the groove, protrudes radially from the tubular metal part, and
   a flange part having a central through opening for receiving the tubular metal part, wherein the flange part has a shoulder for abutting against the stop ring when the flange part is arranged around the stop ring,
   wherein the pipe connector has a first end face at the first portion and a second end face at the second portion, wherein a length of the pipe connector is defined by a distance between the first end face and the second end face, wherein a longitudinal extension of the pipe connector is along a single central axis; and
   wherein each of the outer diameters and of the first portion and the second portion of the tubular metal part are smaller than a diameter of the central through opening of the flange part, wherein the pipe connector further comprises another tubular part comprising a tubular plastic part having a plastic external peripheral surface, wherein a periphery of the tubular plastic part is arranged around a tubular metal surface of the first portion of the tubular metal part.
2. The pipe connector as claimed in claim 1, wherein the second portion and the tubular metal surface of the first portion forms a one-piece metal unit.
3. The pipe connector as claimed in claim 1, wherein the tubular plastic part has a length that is shorter than the length of the first portion of the tubular metal part.
4. The pipe connector as claimed in claim 1, wherein the second portion has an outer diameter d2 which is larger than an outer diameter d3 of the tubular plastic part.
5. The pipe connector as claimed in claim 1, wherein the outer diameter d2 of the tubular metal part at the groove is at least as large as an outer diameter d3 of the tubular plastic part.
6. The pipe connector as claimed in claim 1, wherein the tubular metal part has a greater axial extension than the flange part.
7. The pipe connector as claimed in claim 1, wherein the inner diameter d1 of the tubular metal part is constant.
8. The pipe connector as claimed in claim 1, wherein the stop ring has a slit.
9. The pipe connector as claimed in claim 1, wherein the flange part has a radially extending first flange surface extending between the through opening and the outer periphery of the flange part, wherein the first flange surface aligns with an end face of the tubular metal part when the shoulder mates with the stop ring.
10. The pipe connector as claimed in claim 1, further comprising a removable inner pipe coupling part having an outer diameter smaller than the inner diameter of the tubular metal part, wherein the inner pipe coupling part protrudes from the tubular plastic part when arranged in the tubular metal part.
11. The pipe connector as claimed in claim 10, wherein the inner pipe coupling part comprises a conductive material.
12. The pipe connector as claimed in claim 1, further comprising a fixing device for fixing a portion of the tubular plastic part around the first portion of the tubular metal part.

13. The pipe connector as claimed in claim 12, wherein the fixing device is cylindrical and is arranged to receive the tubular plastic part.

14. The pipe connector as claimed in claim 1, wherein the first portion comprises a plurality of peripheral protrusions.

* * * * *